United States Patent [19]

Harris

[11] 4,102,191

[45] Jul. 25, 1978

[54] DIGITAL FUEL GAUGE

[76] Inventor: Roger J. Harris, 5424 Gregg St., Dallas, Tex. 75235

[21] Appl. No.: 743,458

[22] Filed: Nov. 19, 1976

[51] Int. Cl.² .................... G01F 23/06; G01F 23/10
[52] U.S. Cl. .................... 73/313; 73/304 R; 73/308; 340/625
[58] Field of Search .............. 73/304 R, 308, 313, 73/317; 340/244 A, 244 B

[56] References Cited

U.S. PATENT DOCUMENTS

| | | | |
|---|---|---|---|
| 3,376,568 | 4/1968 | Stewart et al. | 73/313 X |
| 3,623,043 | 11/1971 | Bozoian | 340/244 B X |
| 3,681,707 | 8/1972 | Bean | 331/64 |
| 3,830,090 | 8/1974 | Hersch et al. | 73/304 CX |
| 3,855,585 | 12/1974 | Stout | 73/313 X |
| 3,911,373 | 10/1975 | Ohtake et al. | 331/65 |
| 3,940,679 | 2/1976 | Brandwein et al. | 340/249 X |

Primary Examiner—Richard C. Queisser
Assistant Examiner—Charles Gorenstein
Attorney, Agent, or Firm—Gerald G. Crutsinger; Larry B. Dwight

[57] ABSTRACT

A digital readout fuel gauge for monitoring the liquid level in a fuel storage tank. The device utilizes a preamplifier circuit which comprises a voltage divider network utilizing the fuel gauge tank variable resistor on one side of the divider and a variable resistance on the other side which is connected to a signal processor. The output voltage of the signal processor is connected to the analog input of an analog to digital converter. The analog to digital converter changes the DC voltage levels to a four bit BCD code. The output carrying the code is connected to a decimal digit to a seven segment LED decoder. The digits are generated and displayed on LED indicator units. In addition, a voltage comparator circuit compares the output of the signal processor with a reference voltage and when said output is below a predetermined level, the comparator circuit initiates a warning signal.

4 Claims, 3 Drawing Figures

DIGITAL FUEL GAUGE

BACKGROUND

Automobile vehicles running on gasoline have a gasoline storage tank. The storage tank has a level sensing device generally comprising a variable resistor which increases in resistance as the liquid level in the tank decreases. This produces a voltage increase across the variable resistor as the level of the liquid in the storage tank decreases. Today, most vehicles utilize a magnetic mechanical type gauge. The gauge contains a magnetic coil which moves the pointer relative to the voltage across the variable reistor in the fuel tank.

It is desirable to have a more accurate level sensing device which gives the driver of the vehicle the exact amount of fuel left in the storage tank so that he may estimate his remaining driving distance. In addition, the device gives more readily usable information in calculating fuel consumption rate and is particularly useful in rally type vehicles.

It is particularly desirable to utilize a device which may be adapted to use in all vehicles with the present gasoline tank sender to minimize replacement of the sending unit.

SUMMARY

I have devised a digital electronic fuel gauge which gives the exact quantity of gasoline remaining in the fuel tank without having to interpolate a gauge. The device is adaptable to all size fuel storage tanks and attaches to the tank sender unit presently employed on nearly all vehicles.

The device comprises a pre-amplifying circuit which converts the variable DC resistance of the tank transmitter element into precise DC voltage levels which may be converted into decimal codes. The display unit contains three LED one digit readouts representing tenths, units and tens of gallons of fuel remaining in the tank. The tank sender unit is a variable resistor generally comprising a moveable arm attached to a float which rests on the surface of fuel such that as the fuel level changes the resistance of the element changes generally from a low resistance when the tank is full to a high resistance when the tank is empty.

The device utilizes an analog to digital (A-D) converter circuit which converts DC voltage levels to a binary coded decimal digit (BCD) code. The DC voltage levels are generated by a preamplifier circuit comprising a voltage divider between the tank sender unit and a variable resistance. The variable resistance is utilized to calibrate the unit for the particular storage tank utilized such that, if the tank holds 30 gallons the device is calibrated to 30.0 gallons.

The voltage level, which is generally the reverse of the type of signal needed by the A-D converter is inverted in polarity by the signal processing unit of the preamplifier. These levels are transmitted to the analog input of an analog to digital converter subsystem.

The voltage of the analog input determines the output of the A-D converter; for example, an input of 1.00 volt results in an output of 000 and an input of 2.00 volts results in an output of 999. The subsystem generates signals to drive the analog to digital converter which converts the signals to a four-bit binary coded decimal (BCD) code which is fed into a decimal digit to 7-segment LED decoder unit. The decoder is connected to the three LED units which produce one digit output per group of BCD signals. The decoder has 7 output lines connected in parallel to each LED display unit. The A-D converter turns each display unit on, sequentially, as each group of BCD signals is transmitted to the LED units.

A voltage comparator compares the output of the signal processor and if said output falls below a predetermined level the circuit initiates a warning signal by interrupting the decoder output. Interruption is caused by grounding the decoder circuit on a periodic basis, usually by an oscillator timing circuit.

A stabilizing circuit is utilized to prevent incidental changes in the display of fuel quantity due to the driving of the vehicle which are normally dampened out by magnetic mechanical type gauges which are slower to react. The circuit allows an output from the A-D converter once every 15 seconds. A voltage regulator is employed to provide a constant positive 5 volts for driving the circuit.

The primary object of the invention is to produce a digital readout fuel gauge which is adaptable to all makes and types of vehicles to read the level of fuel remaining in the fuel tank.

Another object of the invention is to produce a device which accurately displays the level of liquid left in a storage tank.

A further object of the invention is to produce a digital readout device which also warns the driver of a low fuel level.

A further object of the invention is to produce a readout device which is capable of being inserted in the dash where the present mechanical type gauge is located on the vehicle thus requiring minimal modifications of the vehicle's panel.

A still further object of the invention is to provide a fuel level readout device which is accurate and highly sensitive to changes which may be employed to give accurate fuel consumption rates and compute the remaining travel distance of the vehicle.

Other and further objects of the invention will become apparent upon a reading of the detailed specification hereinafter following and by reference to the drawings annexed hereto.

DESCRIPTION OF THE DRAWINGS

The drawings of the preferred embodiment of the invention are annexed hereto so that the invention may be more fully understood, in which.

Numeral references are employed to designate various elements and like numerals are used to designate like elements throughout the various figures of the drawings.

DESCRIPTION OF A PREFERRED EMBODIMENT

Figure 1:
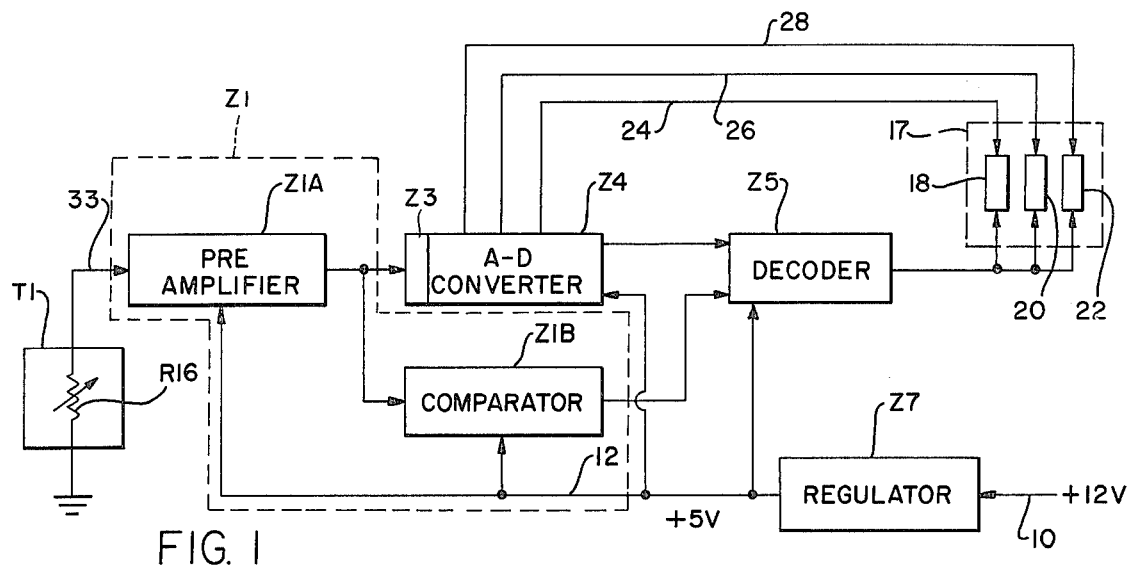
FIG. 1 is a block diagram diagrammatically illustrating the invention.
Figure 2:
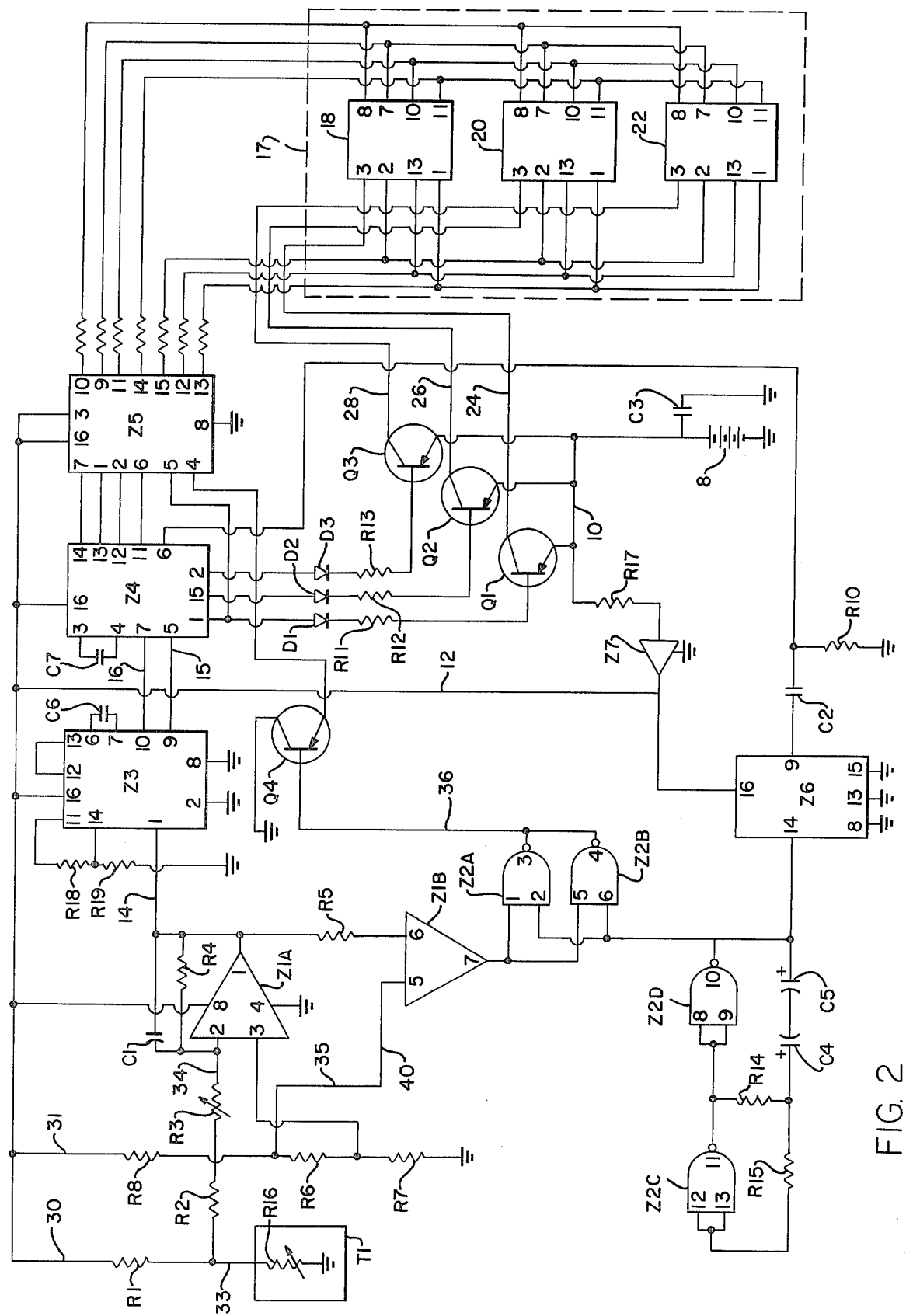
FIG. 2 is a detailed schematical representation of the device.

Generally referring to FIGS. 1 and 2 of the drawings, the device comprises a digital electronic fuel gauge which displays the quantity or volume of liquid remaining in the storage tank T1 by a 3-digit readout display 17 comprising three LED (Light Emitting Diode) 7 segment displays representing tenths, units and tens of gallons. It should be readily appreciated that the device may be expanded to any number of display LED circuits necessary to read the capacity of the tank. The described form of the invention is capable of reading 99.9 gallons which is suitable for most fuel tanks used on commercial or personal vehicles.

Figure 3:
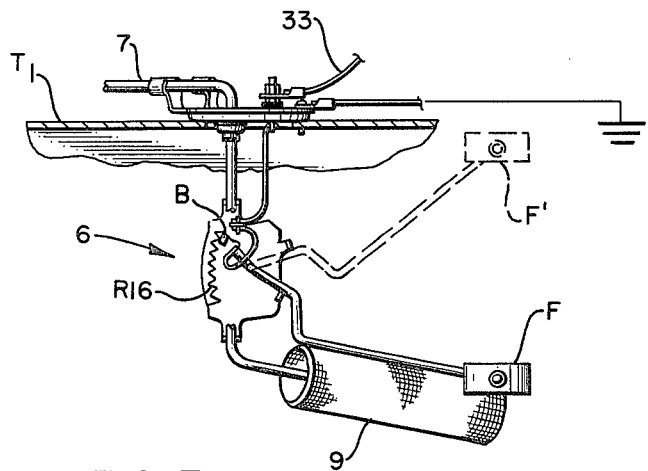
FIG. 3 is a diagrammatic illustration of a typical fuel level float.

The fuel gauge is connected to variable resistance liquid level detection means such as the existing sender element 6 (FIG. 3) which comprises a variable resistor R16 having a sliding brush B connected to a float F which rests on the surface of the fuel such that as the fuel level changes the resistance value of R16 also changes. The device moves from the position shown in dashed outline F′ to the position shown in full outline F. The tank sender unit is enclosed in tank T1 and generally has approximately 70 ohms of resistance when the float F is at position F and 10 ohms of resistance when the float F is at position F′. Variable resistor R16 generally has one end connected to the positive voltage source by line 33 and the other end is grounded to the chassis of the vehicle. A fuel line 7 is positioned in tank T1 and connected to filter 9.

Variable resistor R16 forms a portion of a voltage divider network such that the variations of DC voltage level are converted into a BCD (binary coded decimal) digit code by A-D (analog to digital) converter Z4. The BCD digit code is then decoded by decimal digit to 7-segment LED decoder Z5 and illuminated on one of the display indicators 18, 20 or 22 of display 17.

The digital fuel gauge has a level comparator circuit Z1B which senses the DC voltage level applied to the A-D converter Z4 such that when the voltage level reaches a predetermined threshold level which corresponds to a predetermined digital output, for example, 3.0 gallons, the level comparator Z1B generates an output signal. The output from an oscillator circuit is selectively passed to decoder circuit Z5 through NAND circuits Z2A and Z2B to cause the periodic interruption of circuit Z5, causing a flashing of the output of the indicators 18, 20 and 22 as will be more fully explained hereinafter.

As will become apparent from the following description, the device utilizes solid state electronics.

The device is generally connected to a 12 volt power supply such as battery 8 which is generally found in most modern vehicles. Line 10 connects the 12 volts from battery 8 through resistor R17 to voltage regulator 27. A stabilizing capacitor C3 is connected between line 10 and ground to filter out undesirable noise. Voltage regulator Z7 is a common 3 pin type regulator such as type F78L05 manufactured by Fairchild Semiconductor or the equivalent.

The voltage regulator Z7 produces a constant positive 5 volts which is connected by line 12 to integrated circuits Z1, Z3, Z4, Z5, and Z6.

The 5 volt source is connected to a voltage divider network which divides between legs 30 and 31. Leg 30 of the voltage divider network is connected to resistor R1 which is further divided into a voltage divider with sides 33 and 34. Side 33 is connected to variable resistor R16 of the tank T1. Variable resistor R3 is connected in series with resistor R2. Resistor R3 is a potentiometer which is adjustable to compensate for the size of tank T1, as will be more fully explained hereinafter. Side 34 is connected to a preamplifier means generally comprising a signal processor Z1A which comprises a portion of integrated circuit Z1 such as type NE532V manufactured by Signetics Corporation.

Signal processor Z1A inverts the polarity of the DC voltage signals. The output (pin 1) of signal processor Z1A is connected to the analog input (pin 1) of analog of digital converter subsystem Z3. In addition, the output pin 1 from Z1A is connected to resistor R5 to the input (pin 6) of voltage comparator Z1B, the second portion of the integrated circuit Z1.

The analog to digital convertor subsystem Z3 contains the general controls of the A-D (analog to digital) converter Z4 and is generally of a type MC1405L and A-D converter Z4 is a type MC14435VP or equivalent, both are manufactured by Motorola. An input of 1.00 volts to analog input (pin 1) of subsystem Z3 999; causes a binary coded output from A-D converter Z4 of 000. An input of 2.00 volts to analog input pin 1 of subsystem Z3 will cause a binary coded output from A-D converter Z4 of 999. Voltages between these parameters will cause a digital output between 000 and 999; for example, an input of 1.300 volts will result in a coded output of 300.

Lines 16 and 15 connect the subsystem Z3 with the A-D converter Z4. The A-D convertor is a processing or convertor means which changes the DC voltage levels from side 34 of the voltage divider into a BCD (binary coded decimal) digit code. The 4 bit BCD code is transmitted through output pins 11–14 to decoder means such as the decimal digit to 7-segment LED decoder driver circuit Z5. Decoder Z5 is of a type number SN7447N manufactured by Texas Instruments, Inc. of Dallas, Tex.

The decoder means generally comprises four inputs to receive the BCD code and seven outputs which are connectable to a standard 7-segment display LED unit such as indicators 18, 20, and 22.

In the preferred embodiment, the A-D convertor Z4 transmits by way of output lines 11–14 three different groups, each group comprising a single digit. Each of these groups pick up the ten possible patterns of high and low voltage levels to form the decimal digit on indicators 18, 20 and 22. The A-D convertor Z4 contains additional circuitry which rapidly scans from one group to another, sequentially making each group available at output lines 11–14 for an interval of approximately 50 microseconds.

Each group of code is received by the decoder Z5 and transmitted through output pins 9, 10, 11, 12, 13, 14 and 15 to the 7-segment indicators 18, 20, and 22. The display units 18, 20 and 22 comprise basic LED display units such as type HP5082-7750 for units 18 and 20 and HP5082-7730 for display unit 22 both manufactured by Hewlett-Packard.

A-D converter Z4 has 3 output pins 1, 15 and 2 which sequentially have a low output. Pins 1, 15 and 2 are connected through diodes D1, D2, and D3 and resistors R11, R12 and R13 to the bases of transistors Q1, Q2 and Q3, respectively. The common emitters in transistors Q1, Q2, Q3 are connected to the line 10. The collector of each transistor Q1-Q3 is connected, respectively, to pin 3 of indicator display units 18, 20 and 22. Since the 4 bit BCD code is transmitted in three groups, each group is sequentially transmitted over the output lines 9-15 of decoder Z5 to each of the indicator units 18, 20 and 22. The A-D convertor has a normally high output on pins 1, 15 and 2. When the output is sequentially made low on each pin, this enables each transistor Q1, Q2, and Q3, respectively; thus, connecting 12 volts to enable the respective indicator units 18, 20 or 22. The result is that only one indicator unit 18, 20 or 22 will light up at a time for the data group present on the A-D convertor output lines 11-14. The end result is that the three digits light up one at a time, sequentially, in a repeated pattern which is so fast the eye perceives all digits to be continuous. For example, each of the three digits have a cycle which repeats approximately 6600 times per second.

The integrated circuit 21 contains a voltage comparator circuit Z1B, as hereinbefore described. The second leg 31 of the primary voltage network comprises a series of resistors R6, R7 and R8. A reference voltage is tapped from leg 31 between the resistors R6 and R8 and is connected to input pin 5 of the voltage comparator circuit Z1B by line 40. This provides a reference voltage to compare with the output of signal processor Z1A. When the output of the signal processor Z1A drops below a predetermined level, as compared to the reference voltage, a warning signal is developed. When the input to pin 6 of the voltage comparator Z1B is higher than the input at pin 5, the output of pin 7 is normally low. When the input to pin 6 drops below pin 5, the output of pin 7 is high. This enables two parallel NAND gates Z2A and Z2B. The NAND gates Z2A and Z2B are connected to a low frequency oscillator formed by circuits Z2C and Z2D. The low frequency oscillator produces a pulse or cycle approximately every 1.5 seconds to NAND gates Z2A and Z2B thus drawing pin 4 of decoder Z5 down. An additional transistor Q4 is placed on line 36 to aid in grounding pin 4 to interrupt decoder Z5. NAND gates Z2A and Z2B act to periodically interrupt the decoder Z5 output pins 9-15 of decoder circuit Z5 by grounding same. This causes a flashing output on the indicator displays 18, 20 and 22 which serves as a low level warning system. The threshold level of the voltage input to pin 6 of the voltage comparator Z1B is adjustable by placing a potentiometer (not shown) on input pin 5 to circuit Z1B. The circuits Z2A, Z2B, Z2C and Z2D may be produced in integrated form and may be of a type number such as CD4011AE manufactured by RCA.

In addition, the output of low frequency oscillators Z2C and Z2D is connected to decade counter Z6. Decade counter Z6 has one output for each 10 inputs from the low frequency oscillator. The decade counter output has one output approximately every 15 seconds. The output signal from counter Z6 is connected through a differentiated circuit formed by capacitor C2 and resistor R10. Resistor R10 is connected to pin 6 of the A-D convertor Z4.

The output of decade counter Z6 is normally low; however, with every cycle (15 seconds) the output peaks upward. This allows a change in the output of analog digital converters Z4. Problems develop when the moving storage tank T1 is in a vehicle which is moving over rough surface and therefore has temporary changes in the level due to sloshing of the liquid in the tank. The system is so fast that it would normally reflect these changes and give a constant change in the liquid level. The purpose of the decade counter Z6 is to limit the output on the 4-bit BCD code connected from outputs 11-14 to a longer time period, such as every 15 seconds. Although information from subsystem Z3 is constantly transmitted to A-D converter Z4, the output of the A-D converters is limited to one change every cycle of decade counter Z6. It should be readily apparent that by changing the low frequency oscillator the time of the length of the cycle will be changed. The decade counter Z6 is of a type number CD4017CN manufactured by RCA.

From the foregoing it should be readily apparent that the circuit provides a voltage level sensing device which converts the DC voltage levels to the proper digital form for decimal digit display on the 7-segment LED circuit such as indicators 18, 20 and 22.

In practice, all vehicles of different manufacture have different size fuel storage tanks. These tanks range anywhere from 8 to 30 gallons on a normal passenger car and have larger capacities on commercial vehicles which contain larger tanks. Variable resistor R3 is provided in the circuit for initial adjustment of the output display to a full tank. Adjustment is accomplished by filling the tank T1 with fuel. Then variable resistor R3 is adjusted, by turning same, to cause an indicated display on indicators 18, 20, and 22 to equal the quantity given by manufacturers specifications. For instance, if the tank T1 holds 30 gallons, variable resistor R3 would be adjusted until the indicators 18, 20, and 22 read 30.0. Indicator unit 22 is preferably a smaller unit than units 18 and 20 to indicate tenths of a gallon without the necessity of having a decimal point.

As variable resistor R16 moves with the decreasing fuel level, the resistance changes from approximately 10 ohms, at full, to 70 ohms, at empty. This causes an increase in voltage across resistor R16 from approximately 0.2 volts when the tank is full to 1.5 volt when the tank is empty. This causes a decrease in voltage across leg 34 of the voltage divider, and therefore a decrease in the analog input pin 1 of subsystem Z3. As the analog input voltage decreases for instance, for a 30 gallon tank, from 1.300 to 1 volt the digital display will decrease from the 300 to 000.

The respective value of each component in the preferred embodiment is shown in the Table 1 following and further description is not deemed necessary. However, it should be readily apparent that equivalent components and other values may be substituted within general practice of the art without effecting the performance of the fuel guage.

TABLE 1

| Reference Number | Description | Type or Valve |
|---|---|---|
| Q1 - Q4 | transistor | 2N4403 |
| D1 - D3 | diode | 1N757A |
| R1 | resistor | 270 ohms |
| R2 | resistor | 68K ohms |
| R3 | variable resistor | 50K ohms |
| R4 | resistor | 27K ohms |
| R5 | resistor | 10K ohms |
| R6 | resistor | 1K ohms |
| R7 | resistor | 27K ohms |
| R8 | resistor | 110K ohms |
| R9 | resistor | 270 ohms |
| R10 | resistor | 100K ohms |
| R11 - R13 | resistor | 220 ohms |
| R14 | resistor | 680K ohms |
| R15 | resistor | 1 megohm |
| R17 | resistor | 51 ohms |
| R18 | resistor | 1.5K ohms |
| R19 | resistor | 6.8K ohms |
| C1 | capacitor | 100 microfarads |
| C2 | capacitor | .1 microfarads |
| C3 | capacitor | 33 microfarads |
| C4 - C5 | capacitor | 1.5 microfarads |
| C6 | capacitor | 47 microfarads |
| C7 | capacitor | 510 picafarads |

From the foregoing it should be readily apparent that each of the embodiments hereinbefore described accomplishes the objects of the invention hereinbefore discussed.

It should be appreciated that other and further embodiments of the invention may be devised without departing from the basic concept thereof.

Having described my invention, I claim:

1. Apparatus to measure the quantity of liquid in a storage tank comprising: a DC voltage supply; means to regulate said DC voltage supply; a voltage divider network means connected to said regulated voltage supply; a liquid level sensing means connected to one side of the voltage divider network, said voltage divider network producing a first DC voltage proportional to the ratio of the volume of liquid in the tank to the inside volume of said tank; a preamplifier means connected to the other side of the voltage divider network for producing a second DC voltage representing the actual volume of liquid in said tank; an A-D converter means, the output of said preamplifier means being connected to an A-D converter means to convert said second DC voltage to a binary coded decimal digit code said binary coded decimal code being comprised of several groups of binary bits, each group representing a different decimal digit, said converter means sequentially generating each group of binary bits; decoder means connected to said output of said A-D converter means to receive said sequentially generated binary decimal digit code, said decoder means producing decimal digit codes; display means comprised of a plurality of display units each dedicated to a different decimal digit connected to said decoder means to receive said decimal digit code; enabler means connected between A-D converter means and the display means to selectively enable each display unit so that each display unit receives only the decimal digit code to which it has been dedicated; voltage comparator means adapted to receive a voltage output of the preamplifier means to compare same with a predetermined voltage level such that when the output of the preamplifier means falls below a predetermined voltage level, the voltage comparator means initiates a warning signal; NAND gates connected between the voltage comparator means and decoder means; oscillator means connected to said NAND gates such that when the voltage comparator enables the NAND gates, the output of the decoder means is periodically interrupted; and a decade counter, the input of said decade counter being connected to the output of the oscillator means, the output of the decade counter being connected to the A-D converter means to control the cycle of the output of the A-D converter means.

2. Apparatus to measure the quantity of liquid in a storage tank comprising:
resistance type liquid level detection means at least partially disposed in said tank, said detection means including a voltage divider circuit coupled to a DC potential source, said voltage divider circuit producing a signal representing the ratio of the liquid level in said tank relative to the tank depth,
preamplifier means electrically connected to said voltage divider circuit and responsive to said ratio signal for producing an output signal representative of the volume of liquid in said tank, said preamplifier means including adjustable circuit means for calibrating said output signal so as to cause display indicator means to display a direct measurement of the volume of liquid in said tank irrespective of tank size,
converter means, responsive to said preamplifier output signal, for converting said output signal to a binary coded decimal code,
decoder means, responsive to said binary coded decimal code, for producing decimal digits equivalent to said binary coded decimal code, and
display indicator means coupled to said decoder means for displaying said decimal digits.

3. Apparatus as claimed in claim 2 further including means for generating a reference signal, comparator means, one input of which is connected to said reference signal generating means, a second input of which receives said preamplifier output signal, said comparator means generating an output indicative of the relative levels of said two inputs thereto, oscillator means for generating periodic pulse type signals, gating means responsive to the output from said comparator means for selectively passing said oscillator produced pulse type signals when the level of the preamplifier output signal falls below the level of said reference signal by a predetermined amount, the output of said gating means being connected to said decoder means to cause said decoder means to be periodically, electrically disabled when the preamplifier output signal is below the level of said reference signal by said predetermined amount, whereby said display indicator means generates a flashing display when the quantity of liquid in said tank drops below a predetermined quantity.

4. Apparatus as claimed in claim 2 further including oscillator means for generating periodic pulse type signals, counter means responsive to said periodic pulse type signals for producing output pulses at a frequency which is a submultiple of the frequency of said pulse type signals, said converter means including means to selectively enable its output, said counter produced output signals being applied to said means to selectively enable the converter means output whereby said converter means output is periodically enabled at a rate determined by the frequency of counter produced signals, thereby eliminating rapid changes in the converter output signal due to the sloshing of liquid in said tank.

* * * * *